(12) United States Patent  
Hirano

(10) Patent No.: US 8,705,124 B2
(45) Date of Patent: Apr. 22, 2014

(54) IMAGE FORMING APPARATUS, COLOR-MISREGISTRATION CORRECTING METHOD, AND COMPUTER PROGRAM PRODUCT

(75) Inventor: Masanori Hirano, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 372 days.

(21) Appl. No.: 13/137,781

(22) Filed: Sep. 13, 2011

(65) Prior Publication Data

US 2012/0069359 A1  Mar. 22, 2012

(30) Foreign Application Priority Data

Sep. 16, 2010 (JP) ................... 2010-207600
Aug. 8, 2011 (JP) ................... 2011-173465

(51) Int. Cl.
*H04N 1/60* (2006.01)
*G06K 1/00* (2006.01)

(52) U.S. Cl.
USPC .......... 358/1.9; 358/504; 358/540; 358/3.26; 399/301; 399/49; 399/72; 347/116; 347/115; 347/24

(58) Field of Classification Search
None
See application file for complete search history.

(56) References Cited

U.S. PATENT DOCUMENTS

| 7,499,198 B2 | 3/2009 | Hirano |
| 7,600,842 B2 | 10/2009 | Hirano et al. |
| 2005/0200900 A1 | 9/2005 | Hirano |
| 2006/0181562 A1 | 8/2006 | Hirano et al. |
| 2008/0278764 A1 | 11/2008 | Hirano et al. |
| 2011/0141528 A1 | 6/2011 | Hirano et al. |

FOREIGN PATENT DOCUMENTS

| JP | 2006-192883 A | 7/2006 |
| JP | 2006-264270 A | 10/2006 |
| JP | 2008-213261 A | 9/2008 |
| JP | 2008-229915 A | 10/2008 |

*Primary Examiner* — Quang N Vo
(74) *Attorney, Agent, or Firm* — Harness, Dickey & Pierce, P.L.C.

(57) ABSTRACT

An image forming apparatus includes recording heads for ejecting recording liquids of colors onto a recording medium. The apparatus includes a reference-patch forming unit that records a reference patch, the reference patch being formed by overlaying dot array patterns recorded with the recording liquids of different colors, the dot array patterns having no correlation therebetween; a detection-patch-group forming unit that records a detection patch group including detection patches, each of the detection patches being formed by overlaying dot array patterns recorded with the recording liquids of the different colors, the dot array patterns having a same cycle of regular dot array, the detection patches being allocated with different misregistration amounts of the dot array patterns; and a color-misregistration correcting unit that corrects color misregistration based on results of comparison between color tone of the reference patch and color tone of each of the detection patches.

10 Claims, 10 Drawing Sheets

FIG.11A  FIG.11B  FIG.11C
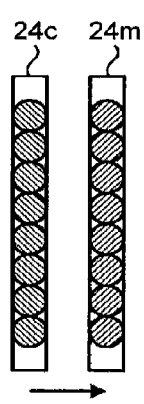
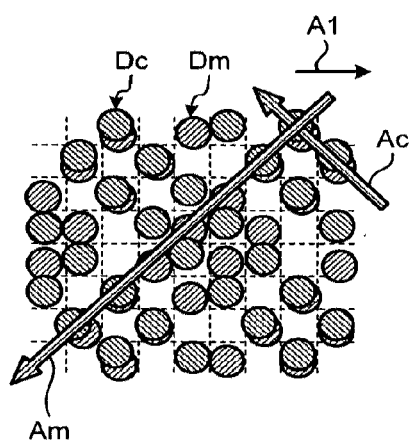
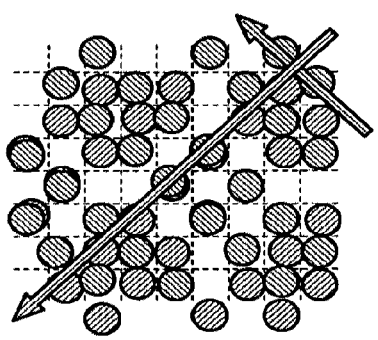
FIG.12
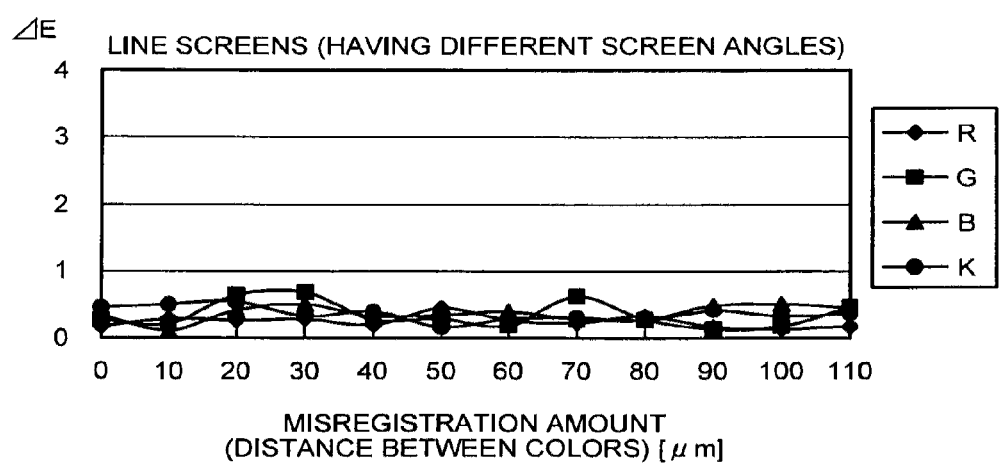

DIRECTION OF MISREGISTRATION

MISREGISTERED    NOT MISREGISTERED

MISREGISTERED    NOT MISREGISTERED

IMAGE FORMING APPARATUS, COLOR-MISREGISTRATION CORRECTING METHOD, AND COMPUTER PROGRAM PRODUCT

CROSS-REFERENCE TO RELATED APPLICATIONS

The present application claims priority to and incorporates by reference the entire contents of Japanese Patent Application No. 2010-207600 filed in Japan on Sep. 16, 2010 and Japanese Patent Application No. 2011-173465 filed in Japan on Aug. 8, 2011.

BACKGROUND OF THE INVENTION

1. Field of the Invention

The present invention relates to image forming apparatuses, color-misregistration correcting methods, and computer program products.

2. Description of the Related Art

Conventionally, an image forming apparatus for forming a multiple-color image forms a desired image by appropriately overlaying, for instance, CMYK single-color images, or, more specifically, a cyan (C) image, a magenta (M) image, a yellow (Y) image, and a black (K) image, on one another. In some cases, single-color images of an image are misregistered. FIG. 13 is a diagram illustrating an exemplary image, in which misregistration of single-color images has occurred. Each arrow in FIG. 13 indicates a direction, in which misregistration of a single-color image has occurred. Vertical lines, right-down oblique lines, and right-up oblique lines indicate blue, green, and red, respectively. In the example illustrated in FIG. 13, black streaks and a streak of a light color produced by the misregistration of the single-color images are perceptible on the image and hence degrading the image. Furthermore, such misregistration of single-color images can arise a trouble that an image is not reproduced in desired colors or the like.

This misalignment of single-color images (color misregistration) can be caused by a variety of causes, such as variation originated from a manufacture stage of the image forming apparatus per se, a usage condition/handling manner by a user, and/or deterioration with time. It is desired to correct color misregistration because color misregistration degrades an image being formed. This correction is generally performed periodically or irregularly by a user manually or by an automatic correction mechanism mounted on the image forming apparatus.

A conventional color-misregistration correcting method will be described below by way of an example where an inkjet recording apparatus, serving as the image forming apparatus, prints a multiple-color image. FIGS. 14 and 15 are diagrams illustrating the conventional color-misregistration correcting method. In FIGS. 14 and 15, reference symbols $P_c$, $P_m$, $P_y$, and $P_k$ indicate a cyan line pattern, a magenta line pattern, a yellow line pattern, and a black line pattern, respectively. According to this method, the patterns $P_c$, $P_m$, $P_y$, and $P_k$ are printed on a sheet with ink ejected through ink ejection nozzles of the corresponding colors provided in recording heads of the inkjet recording apparatus. It is assumed that the patterns are printed in a color-misregistered state as illustrated on the left-hand sides of FIGS. 14 and 15. Subsequently, a user visually determines misregistration amounts of the patterns $P_c$, $P_m$, $P_y$, and $P_k$ and performs adjustment for the misregistration by using an adjustment mechanism. Alternatively, a colorimeter or the like performs color measurement of the patterns $P_c$, $P_m$, $P_y$, and $P_k$ to determine color misregistration amounts based on color differences between the color-measured colors and reference colors so that an automatic correction mechanism automatically corrects misregistration. As a result, such printed patterns having no color misregistration as those illustrated on the right-hand sides of FIGS. 14 and 15 are obtained.

The color difference is an amount represented as, for instance, $\Delta E$ below when color difference between a measured color and a reference color is quantified by using the L*a*b* values in the standard CIELAB color space, which is a uniform color space in visual perception.

$$\Delta E = \sqrt{\{(L^*1-L^*2)^2+(a^*1-a^*2)^2+(b^*1-b^*2)^2\}}$$

Note that L*1, a*1, and b*1 are an L* value, an a* value, and a b* value of the reference color, respectively, while L*2, a*2, and b*2 are an L* value, an a* value, and a b* value of the measured color, respectively.

Examples of techniques related to the conventional color-misregistration correcting method are described in Japanese Patent Application Laid-open No. 2006-192883, Japanese Patent Application Laid-open No. 2006-264270, Japanese Patent Application Laid-open No. 2008-213261, and Japanese Patent Application Laid-open No. 2008-229915.

However, quality of inkjet recording can vary because smear or faint patchy of ink can occur depending on a combination of paper and ink and/or because positions/size of dots can vary depending on a combination of the paper, the ink and an ink ejection capacity. Therefore, a level of image color reproducibility intended by a designer is not always achieved. More specifically, there can be a case in which smear occurs in a considerable amount on some type of paper, causing line patterns to become blurred and making it difficult to measure accurate positions. There can also be a case in which ink ejection per se is not performed normally because of a condition of nozzle surfaces of ink ejection heads or usage environment (e.g., relatively high or low temperature and/or relatively high or low humidity), thereby producing a large number of satellite drops that make the line patterns blurred, or a case in which an ejection amount and/or an ejection velocity is changed, resulting in reproduction in colors that differ from desired colors. Furthermore, there can be a case in which such situations occur in combination. As a result, a problem that color misregistration cannot be detected accurately, causing a misregistration amount having an error to be obtained and making it difficult to perform accurate correction, arises.

SUMMARY OF THE INVENTION

It is an object of the present invention to at least partially solve the problems in the conventional technology.

According to an aspect of the present invention, there is provided an image forming apparatus that includes recording heads, the recording heads ejecting recording liquids of a plurality of colors onto a recording medium, and performs multiple-color recording. The image forming apparatus includes a reference-patch forming unit, a detection-patch-group forming unit, and a color-misregistration correcting unit. The reference-patch forming unit records a reference patch on the recording medium. The reference patch is formed by overlaying dot array patterns recorded with the recording liquids of different colors. The dot array patterns have no correlation therebetween. The detection-patch-group forming unit records a detection patch group includes detection patches on the recording medium. Each of the detection patches is formed by overlaying dot array patterns recorded with the recording liquids of the different colors. The dot array patterns have a same cycle of regular dot array. The detection patches are allocated with different misregistration amounts of the dot array patterns. The color-misregistration correcting unit corrects color misregistration based on results of comparison between color tone of the reference patch and color tone of each of the detection patches of the detection patch group.

According to another aspect of the present invention, there is provided a color-misregistration correcting method of correcting color misregistration occurred in an image forming apparatus. The apparatus includes recording heads that eject recording liquids of a plurality of colors onto a recording medium. The color-misregistration correcting method includes forming a reference patch on the recording medium by overlaying dot array patterns recorded with the recording liquids of different colors, the dot array patterns having no correlation therebetween; forming a detection patch group including detection patches on the recording medium, each of the detection patches being formed by overlaying dot array patterns recorded with the recording liquids of the different colors, the dot array patterns having a same cycle of regular dot array, the detection patches being allocated with different misregistration amounts of the dot array patterns; and correcting color misregistration based on results of comparison between color tone of the reference patch and color tone of each of the detection patches of the detection patch group.

According to still another aspect of the present invention, there is provided a computer program product including a non-transitory computer-readable medium including computer-readable program codes embodied in the medium for correcting a color misregistration occurred in an image forming apparatus. The apparatus includes recording heads that eject recording liquids of a plurality of colors onto a recording medium. The program codes when executed cause a computer to perform causing the image forming apparatus to form a reference patch on the recording medium by overlaying dot array patterns recorded with the recording liquids of different colors, the dot array patterns having no correlation therebetween; causing the image forming apparatus to form a detection patch group including detection patches on the recording medium, each of the detection patches being formed by overlaying dot array patterns recorded with the recording liquids of the different colors, the dot array patterns having a same cycle of regular dot array, the detection patches being allocated with different misregistration amounts of the dot array patterns; and causing the image forming apparatus to correct color misregistration based on results of comparison between color tone of the reference patch and color tone of each of the detection patches of the detection patch group.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 11A is a diagram illustrating the cyan ink ejection head and the magenta ink ejection head;

FIG. 11B is a diagram illustrating a reference patch printed with no color misregistration, which is generated by using line screens of which screen angles differ from each other by 90 degrees;

FIG. 11C is a diagram illustrating a reference patch printed with color misregistration, which is generated by using line screens of which screen angles differ from each other by 90 degrees;

FIG. 12 is a diagram illustrating a relationship between color misregistration amounts and color differences ΔE in a situation where the reference patch is formed with the dot array patterns generated by using the line screens of which screen angles differ from each other by 90 degrees;

DETAILED DESCRIPTION OF THE PREFERRED EMBODIMENTS

Exemplary embodiments according to the present invention are described in detail below with reference to the accompanying drawings.

Figure 1:
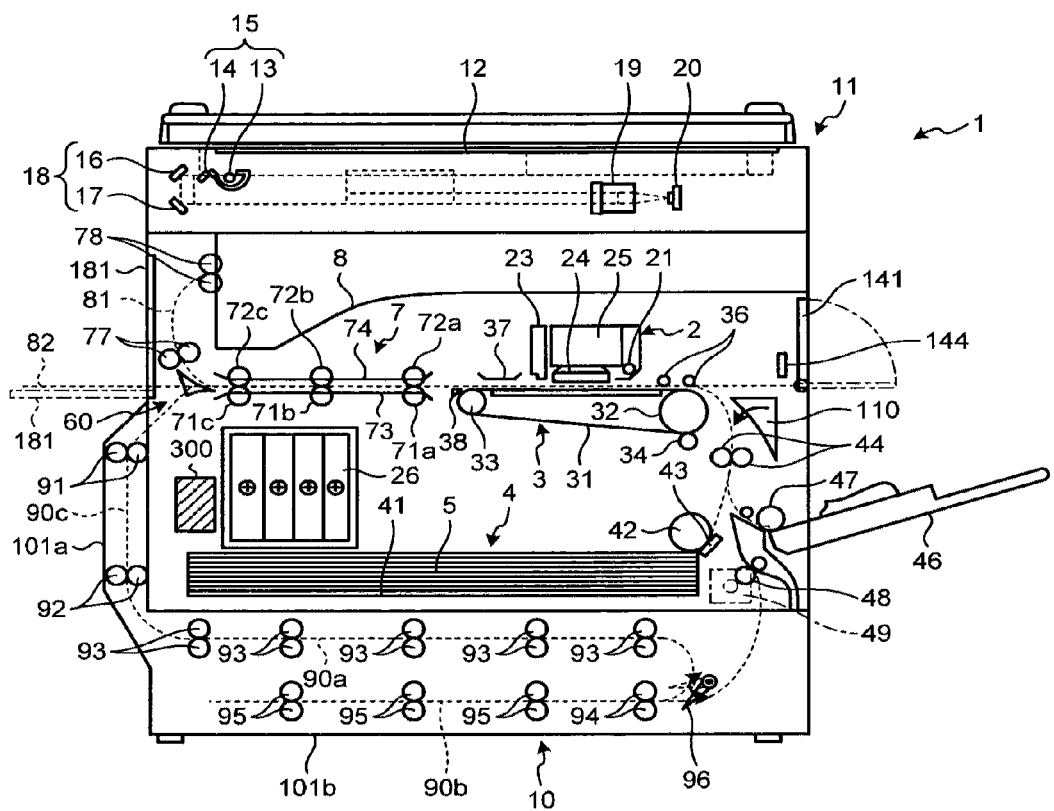
FIG. 1 is a schematic configuration diagram of an image forming apparatus according to an embodiment of the present invention.
Figure 2:
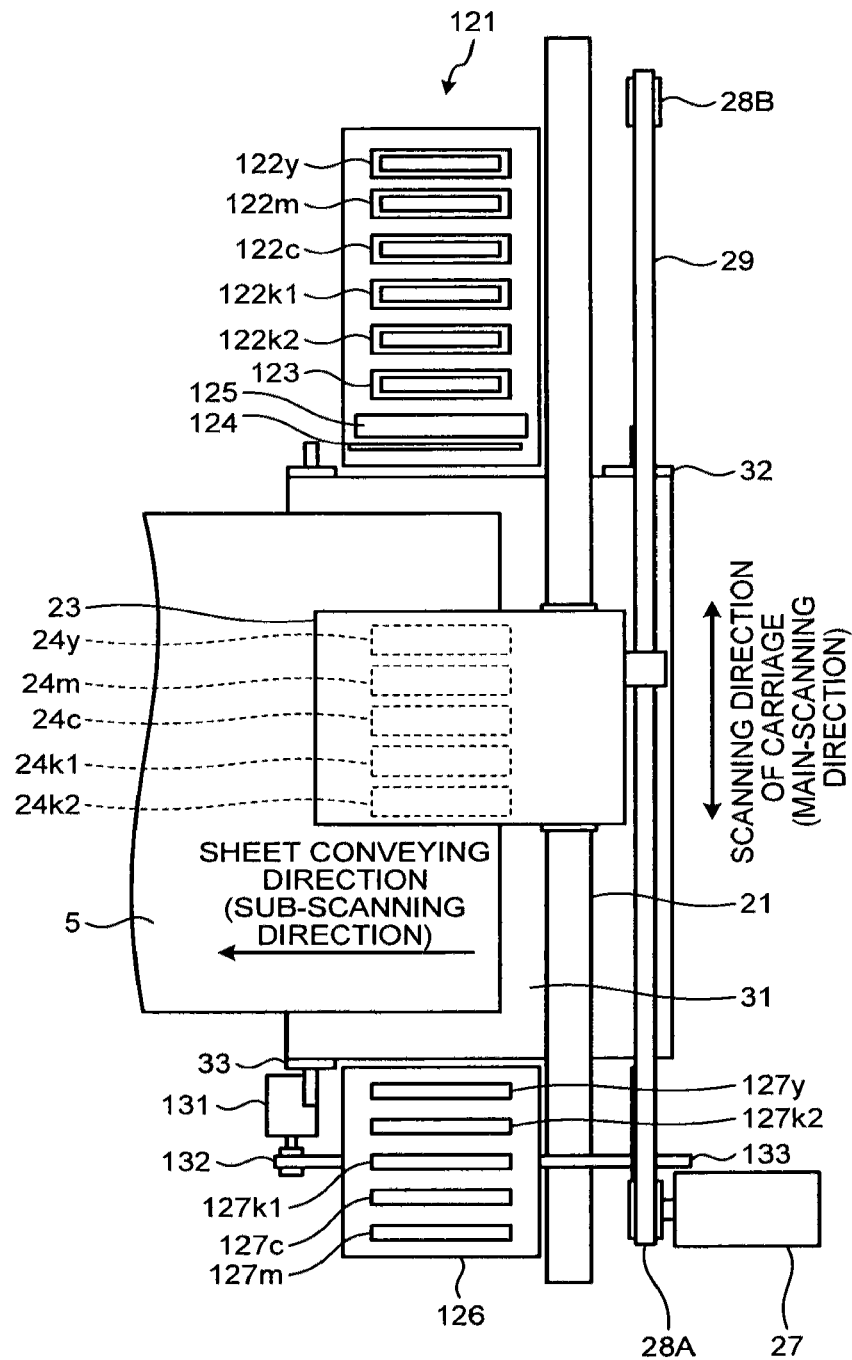
FIG. 2 is a diagram illustrating an image forming unit and a sub-scanning conveying unit of the image forming apparatus illustrated in FIG. 1.
Figure 3:
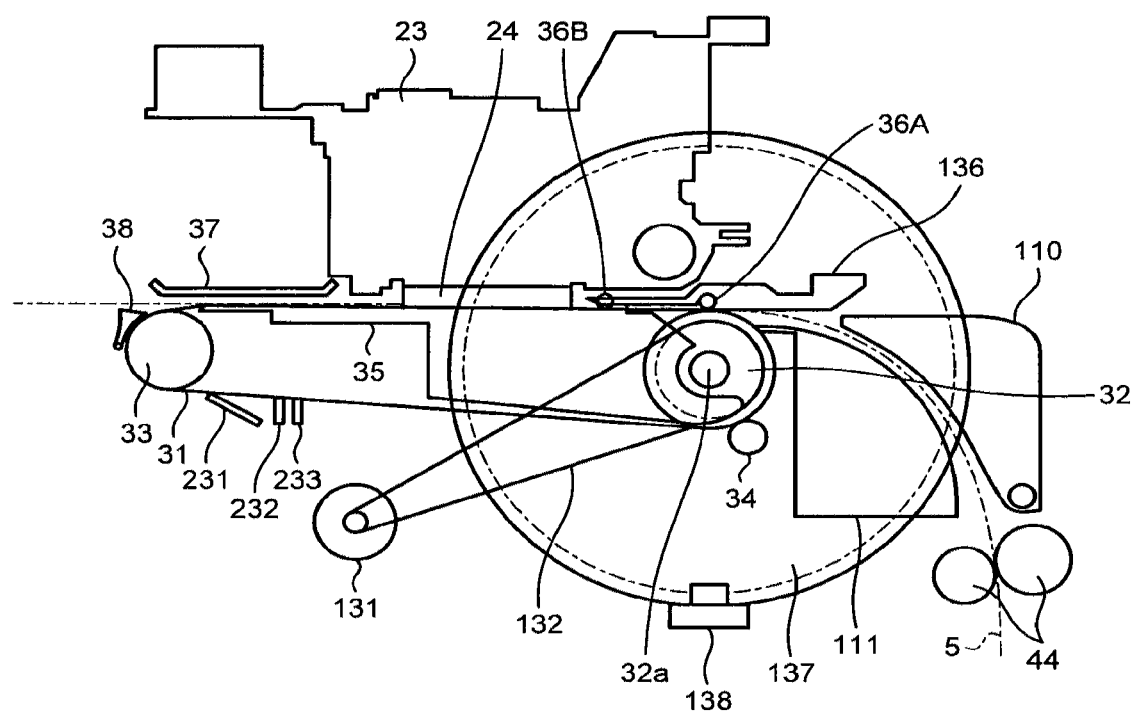
FIG. 3 is a diagram illustrating the sub-scanning conveying unit of the image forming apparatus illustrated in FIG. 1.

FIG. 1 is a schematic configuration diagram of an image forming apparatus according to an embodiment of the present invention. FIG. 2 is a diagram illustrating an image forming unit and a sub-scanning conveying unit of the image forming apparatus illustrated in FIG. 1. FIG. 3 is a diagram illustrating the sub-scanning conveying unit of the image forming apparatus illustrated in FIG. 1. The schematic configuration of the image forming apparatus will be described below with reference to FIGS. 1 to 3.

An image forming apparatus 1 includes, in its body, an image forming unit 2, a sub-scanning conveying unit 3 provided to face the image forming unit 2, a paper feeding unit 4 provided in a lower portion of the apparatus body and including a paper cassette, in which sheets 5, each being a recording medium, are loaded, an output-paper conveying unit 7 provided adjacent to the sub-scanning conveying unit 3, a paper discharge tray 8 provided above the output-paper conveying unit 7, and a duplex printing unit 10 provided in a bottom portion of the apparatus body.

Operations of the image forming apparatus will be schematically described below. The paper feeding unit 4 feeds the sheets 5 to the sub-scanning conveying unit 3 one sheet by one sheet. The sub-scanning conveying unit 3 conveys the fed sheet 5 at a position facing the image forming unit 2. The image forming unit 2 records (prints) a desired image by ejecting recording liquid (ink) onto the sheet 5 being conveyed by the sub-scanning conveying unit 3, thereby performing image formation. In a case in which this printing is single-sided printing, the output-paper conveying unit 7 discharges the sheet 5 onto the paper discharge tray 8. In a case in which this printing is double-sided printing, the output-paper conveying unit 7 feeds the sheet 5 having undergone the single-sided printing into the duplex printing unit 10. The duplex printing unit 10 performs switchback conveyance, and thereafter feeds the sheet 5 having undergone the single-sided printing back to the sub-scanning conveying unit 3. Thereafter, the image forming unit 2 prints a desired image on a side opposite from the printed side of the sheet 5. The output-paper conveying unit 7 then discharges the sheet 5 having undergone double-sided printing onto the paper discharge tray 8.

The image forming apparatus 1 further includes, on the apparatus main body, an image reading unit 11 that reads in an image. The image reading unit 11 serves as an input system for image data to be printed by the image forming unit 2. The image reading unit 11 includes an exposure glass 12, a scanning optical system 15 that includes a light source 13 and a mirror 14, a scanning optical system 18 that includes mirrors 16 and 17, a lens 19, and an image reading element 20.

The image reading unit 11 operates as follows. The scanning optical systems 15 and 18 travel to scan an original placed on the exposure glass 12 while illuminating the original with light emitted from the light source 13. The image reading unit 11 causes the image reading element 20 to read image information pertaining to the original as image signals through the lens 19. The thus-read image signals are digitized and subjected to image processing. The image forming apparatus 1 can print image data obtained by performing the image processing on the image signals in this way.

The image forming apparatus 1 is capable of receiving image data and/or the like from host equipment, which serves as an input system for image data to be printed by the image forming unit 2, over a cable or a network, processing the received image data, and printing the processed image data. Examples of the host equipment include an external information processing apparatus such as a personal computer, an image reading apparatus such as an image scanner, and an imaging apparatus such as a digital camera.

The image forming apparatus 1 further includes a colorimeter for use in correcting a color misregistration. The colorimeter is connected to a control unit 300, which will be described later.

The constituents of the image forming apparatus 1 will be more specifically described below.

First, the image forming unit 2 will be described. As illustrated in FIGS. 1 and 2, the image forming unit 2 includes a guide rod 21, a guide rail (not shown), a carriage 23, recording heads 24, sub tanks 25, ink cartridges 26, a main-scanning motor 27, a drive pulley 28A, a driven pulley 28B, and a timing belt 29.

Mounted on the carriage 23 are the recording heads 24, each of which includes an ink ejection head that ejects recording liquid (ink) of a corresponding color. The carriage 23 is held by the guide rod 21 and the guide rail in a cantilever manner to be movable in the main-scanning direction. The carriage 23 is moved by the timing belt 29 stretched around the drive pulley 28A and the driven pulley 28B to perform scanning in the main-scanning direction.

The image forming unit 2 prints an image by causing the recording heads 24 to eject ink while causing the carriage 23 to move in the main-scanning direction and causing the sub-scanning conveying unit 3 to feed the sheet 5 in a sheet conveying direction (the sub-scanning direction). Put another way, the image forming unit 2 includes what is called a shuttle-type head. Alternatively, the image forming unit 2 may include a line-type head.

The recording heads 24 include five ink ejection heads in total. The ink ejection heads include two ink ejection heads 24k1 and 24k2 each ejecting black (K) ink, and a single ink ejection head 24c, a single ink ejection head 24m, and a single ink ejection head 24y that eject cyan (C) ink, magenta (M) ink, and yellow (Y) ink, respectively. When it is not required to distinguish the color, the ink ejection heads 24k1, 24k2, 24c, 24m, and 24y are simply referred to as "the recording heads 24". Ink of the corresponding color is supplied to each of the ink ejection heads 24c, 24m, and 24y from a corresponding one of the sub tanks 25 mounted on the carriage 23.

As illustrated in FIG. 1, the image forming apparatus 1 is configured such that the ink cartridges 26, which are recording-liquid cartridges, each containing a corresponding one of the black (K) ink, the cyan (C) ink, the magenta (M) ink, and the yellow (Y) ink, are detachably mounted on a cartridge mounting unit from the front side of the apparatus body. Each of the ink cartridges 26 for the different colors supplies ink to the sub tank 25 of the corresponding color. Note that the black ink is supplied from the single ink cartridge 26 to the two black sub tanks 25.

As the recording head 24, what is called a piezo print head can be used. A piezo print head uses a piezoelectric element as a pressure generating unit (actuator unit) that applies pressure onto ink in an ink chamber (pressure generating chamber). The piezo print head flexes a diaphragm, which is a wall of the ink chamber, to change the volume of the internal space of the ink chamber to thereby eject an ink droplet. Alternatively, what is called a thermal-type print head or an electrostatic-force type print head can be used. A thermal-type print head heats ink in an ink chamber by using a heat element to generate an air bubble so that an ink droplet is ejected by pressure applied by the air bubble. In an electrostatic-force type print head, a diaphragm, which is a wall of an ink chamber, and an electrode are positioned to face each other. The electrostatic-force type print head ejects an ink droplet by changing the volume of the internal space of the ink chamber by flexing the diaphragm with an electrostatic force generated between the diaphragm and the electrode.

As illustrated in FIG. 2, a maintenance-and-recovery mechanism 121 that maintains and recovers a condition of nozzles of the recording heads 24 is arranged in a non-print area in the main-scanning direction of the carriage 23. The maintenance-and-recovery mechanism 121 includes, in the non-print area on one side in the scanning direction of the carriage 23, five moisture-retentive caps, or, more specifically, moisture-retentive caps 122k2, 122k1, 122c, 122m, and 122y (when it is not required to distinguish the color, simply referred to as "the moisture-retentive caps 122"), that cap the nozzle surfaces of the five recording heads 24, a single suction cap 123, a wiper blade 124 that wipes the nozzle surfaces of the recording heads 24, and an idler-ejection receiving member 125 for use in ink ejection (idler ejection) that does not contribute to printing.

The maintenance-and-recovery mechanism 121 further includes, in the non-print area on the other side in the scanning direction of the carriage 23, an idler-ejection receiving member 126 for use in ink ejection (idler ejection) from the five recording heads 24 that does not contribute to printing. In the idler-ejection receiving member 126, five openings, or, more specifically, openings 127k2, 127k1, 127c, 127m, and 127y (when it is not required to distinguish the color, simply referred to as "the openings 127") adapted to the recording heads 24 are defined.

The sub-scanning conveying unit 3 will be described below. As illustrated in FIG. 3, the sub-scanning conveying unit 3 includes: an endless carriage belt 31 stretched around a carriage roller 32, which is a drive roller, and a driven roller 33, which is a tension roller; a roller charging device 34, which is a charging unit, that is to be charged with a high alternating voltage applied from a high voltage power supply to charge a surface of the carriage belt 31; a guide member 35 that guides the carriage belt 31 in an area facing the image forming unit 2; a pressure roller 36A that is rotatably held by a holding member 136 and presses the sheet 5 against the carriage belt 31 at a position facing the carriage roller 32 and a leading-end pressing roller 36B that presses the sheet 5 against the carriage belt 31 immediately upstream of the recording heads 24; a guide plate (upper restriction guide plate) 37 that retains the sheet 5, onto which an image has been formed by the image forming unit 2, from its upper-surface side; and a separation claw 38 that separates the sheet 5, onto which the image has been formed, from the carriage belt 31. The endless carriage belt 31 rotates a conveying direction of the sheet 5 by substantially 90 degrees to convey the sheet 5 in a state that the sheet 5 faces the image forming unit 2.

The carriage belt 31 of the sub-scanning conveying unit 3 is configured to be revolved in the sheet conveying direction (the sub-scanning direction) of FIG. 2 by rotation of the carriage roller 32 that is rotated by a sub-scanning motor 131 via a timing belt 132 and a timing roller 133 (see FIG. 2). A brushless DC motor can be used as the sub-scanning motor 131. The carriage belt 31 has a double-layer structure including a front layer, serving as a sheet attracting surface, made of pure resin material, e.g., a pure polyethylene-tetrafluoroethylen (ETFE) material, resistance of which is not adjusted, and a back layer (a intermediate-resistance layer and a ground layer) made of the same material as that of the front layer but resistance of which is adjusted. Alternatively, the carriage belt 31 may have a single-layer structure or a structure of three or more layers.

The sub-scanning conveying unit 3 includes, between the driven roller 33 and the roller charging device 34, a Mylar 231, which is a polyethylene terephthalate (PET) film, serving as a cleaning member that comes into contact with a surface of the carriage belt 31 to remove paper powder and the like sticking to the surface, a brush-like cleaning brush 232 that also comes into contact with the surface of the carriage belt 31, and a diselectrification brush 233 that removes electrostatic charges from the surface of the carriage belt 31. The Mylar 231, the cleaning brush 232, and the diselectrification brush 233 are arranged in this order along a revolving direction of the carriage belt 31.

A high-resolution code wheel 137 is attached to a shaft 32a of the carriage roller 32 of the sub-scanning conveying unit 3. An encoder sensor 138 including a transmission photosensor that detects light transmitted through a slit defined in the code wheel 137 is also provided in the sub-scanning conveying unit 3. The code wheel 137 and the encoder sensor 138 form a rotary encoder.

The paper feeding unit 4 will be described below. As illustrated in FIG. 1, the paper feeding unit 4 is configured to be detachably inserted from the front-surface side of the apparatus body. The paper feeding unit 4 includes a paper cassette 41 capable of containing a large number of the sheets 5 in a stacked manner, a paper feeding roller 42 and a friction pad 43 for feeding the sheets 5 one sheet by one sheet by separating one sheet from the sheets 5, and registration rollers 44 that perform registration of the fed sheet 5. The paper feeding unit 4 also includes a manual feeding tray 46 for storing a large number of the sheets 5 in a stacked manner, a manual feeding roller 47 that feeds the sheets 5 one sheet by one sheet from the manual feeding tray 46, and a carriage roller 48 that conveys the sheet 5 fed from a paper feeding cassette attached to the bottom of the apparatus body as an option or from the duplex printing unit 10, which will be described later. The members, such as the paper feeding roller 42, the registration rollers 44, the manual feeding roller 47, and the carriage roller 48, that feed the sheet 5 to the sub-scanning conveying unit 3 are rotated via an electromagnetic clutch (not shown) by a paper feeding motor (drive unit) 49 that includes an HB-type stepping motor.

The output-paper conveying unit 7 will be described below. As illustrated in FIG. 1, the output-paper conveying unit 7 includes: three carriage rollers, or, more specifically, carriage rollers 71a, 71b, and 71c (when it is not required to distinguish them, referred to as "the carriage rollers 71") that convey the sheet 5 separated by the separation claw 38 of the sub-scanning conveying unit 3; three rollers, or, more specifically, rollers 72a, 72b, and 72c (when it is not required to distinguish them, referred to as "the rollers 72") that face the carriage rollers 71a, 71b, and 71c; a lower guide unit 73 and an upper guide unit 74 that guide the sheet 5 conveyed by the carriage rollers 71 and the rollers 72; and a pair of reverse rollers 77 and a pair of reverse paper discharge rollers 78 that reverse the sheet 5 fed from between the lower guide unit 73 and the upper guide unit 74 and feed the sheet 5 in a face-down orientation to the paper discharge tray 8 via a reverse paper discharging pathway 81, which is a first conveying pathway. The conveying path, along which the sheet 5 is conveyed at the position between the lower guide unit 73 and the upper guide unit 74, is referred to as a conveying path 70 below.

Provided on an exit side of the conveying path 70 is a bifurcating mechanism 60 that performs switching to any one of the first paper discharge pathway 81 that delivers a reversed sheet onto the paper discharge tray 8, a second paper discharge pathway 82, along which a sheet is delivered onto a straight paper-discharge tray 181, which will be described later, and the duplex printing unit 10.

The duplex printing unit 10 provided in the lower portion of the apparatus body will be described below. The duplex printing unit 10 includes a vertical conveying unit 101a that forms a vertical duplex-printing conveying path 90c, along which the sheet 5 fed from the output-paper conveying unit 7 is received through a side-surface portion of the apparatus body and conveyed downward; and a horizontal conveying unit 101*b* that includes a horizontal introducing path 90*a* that receives the sheet 5 from the vertical duplex-printing conveying path 90*c* and conveys the sheet 5 horizontally, and a switchback conveying path 90*b*. The vertical conveying unit 101*a* and the horizontal conveying unit 101*b* are connected into one piece.

The vertical duplex-printing conveying path 90*c* includes a pair of duplex-printing entrance rollers 91 that conveys the sheet 5 fed to the vertical duplex-printing conveying path 90*c* downward and a pair of carriage rollers 92 that receives the sheet 5 conveyed by the duplex-printing entrance rollers 91 and conveys the sheet 5 to the horizontal introducing path 90*a*. Five pairs of duplex-printing carriage rollers 93 that convey the sheet 5 horizontally are provided on the horizontal introducing path 90*a*. Duplex-printing exit rollers 94 and three pairs of duplex-printing carriage rollers 95, which are reverse rollers, that reverse the sheet 5 fed from the horizontal introducing path 90*a* and feed back the sheet 5 to the carriage roller 48 are provided on the switchback conveying path 90*b*.

A bifurcating plate 96 that performs switching between a conveying pathway for conveying the sheet 5 from the horizontal introducing path 90*a* to the switchback conveying path 90*b* and a conveying pathway for conveying the sheet 5 from the switchback conveying path 90*b* back to the carriage roller 48 is swingably provided on a right-hand side, of FIG. 1, of the duplex-printing exit rollers 94. The bifurcating plate 96 is swingable between a position for switchback indicated by a solid line in FIG. 1 and a position for feeding back a sheet indicated by a broken line.

The sheet 5 delivered out of the duplex printing unit 10 is fed to the carriage roller 48 to be delivered to the registration rollers 44.

As illustrated in FIG. 3, an open/close guide plate 110 facing a guide unit 111 is swingably provided to prevent application of a back tension or the like onto the sheet 5 by forming a loop (slack) in the sheet 5 between the carriage roller 32 and the pressure roller 36 of the sub-scanning conveying unit 3, and the registration rollers 44 when the sheet 5 fed from any one of the paper cassette 41 of the paper feeding unit 4, the manual feeding tray 46, and the duplex printing unit 10 is conveyed by the registration rollers 44.

The open/close guide plate 110 swings from a state illustrated in FIG. 1 in a direction indicated by an arrow in FIG. 1 to guide the sheet 5 when the sheet 5 is fed from the registration rollers 44 into the sub-scanning conveying unit 3. At an instant when the sheet 5 reaches the sub-scanning conveying unit 3, the open/close guide plate 110 returns to the state illustrated in FIG. 1, in which the open/close guide plate 110 can form the loop.

As illustrated in FIG. 1, the image forming apparatus 1 further includes a single-sheet manual feeding tray 141 for manual single-sheet feeding at one end portion of the apparatus body. The single-sheet manual feeding tray 141 can be opened (in a drop-down manner) relative to the apparatus body. When performing the manual single-sheet feeding, the single-sheet manual feeding tray 141 is dropped down to a position indicated by a phantom line in FIG. 1. The sheet 5 manually fed from the single-sheet manual feeding tray 141 is guided by an upper surface of the open/close guide plate 110 to thus be linearly inserted into a nip between the carriage roller 32 and the pressure roller 36 of the sub-scanning conveying unit 3. Reference numeral 144 denotes a shutter member for opening and closing a manual paper feed port.

The straight paper-discharge tray 181 for linearly discharging the sheet 5, onto which an image has been formed, in a face-up orientation is provided at the other end portion of the apparatus body. The straight paper-discharge tray 181 can be opened (in a drop-down manner) relative to the apparatus body. By opening (dropping down) the straight paper-discharge tray 181, the straight paper discharge pathway, or the second paper discharge pathway 82, for linearly discharging the sheet 5 fed from the lower guide unit 73 and the upper guide unit 74 onto the straight paper-discharge tray 181 is formed in the output-paper conveying unit 7.

Accordingly, in a situation where a sheet, such as an overhead transparency film or a thick sheet, that is difficult to be conveyed along a curved passage is to be used, the manual single-sheet feeding of the sheet can be performed from the single-sheet manual feeding tray 141 so that the sheet 5 is linearly conveyed to the straight paper-discharge tray 181. As a matter of course, even a normal sheet of ordinary paper or the like can be fed from the single-sheet manual feeding tray 141 to be linearly discharged onto the straight paper-discharge tray 181.

Figure 4:
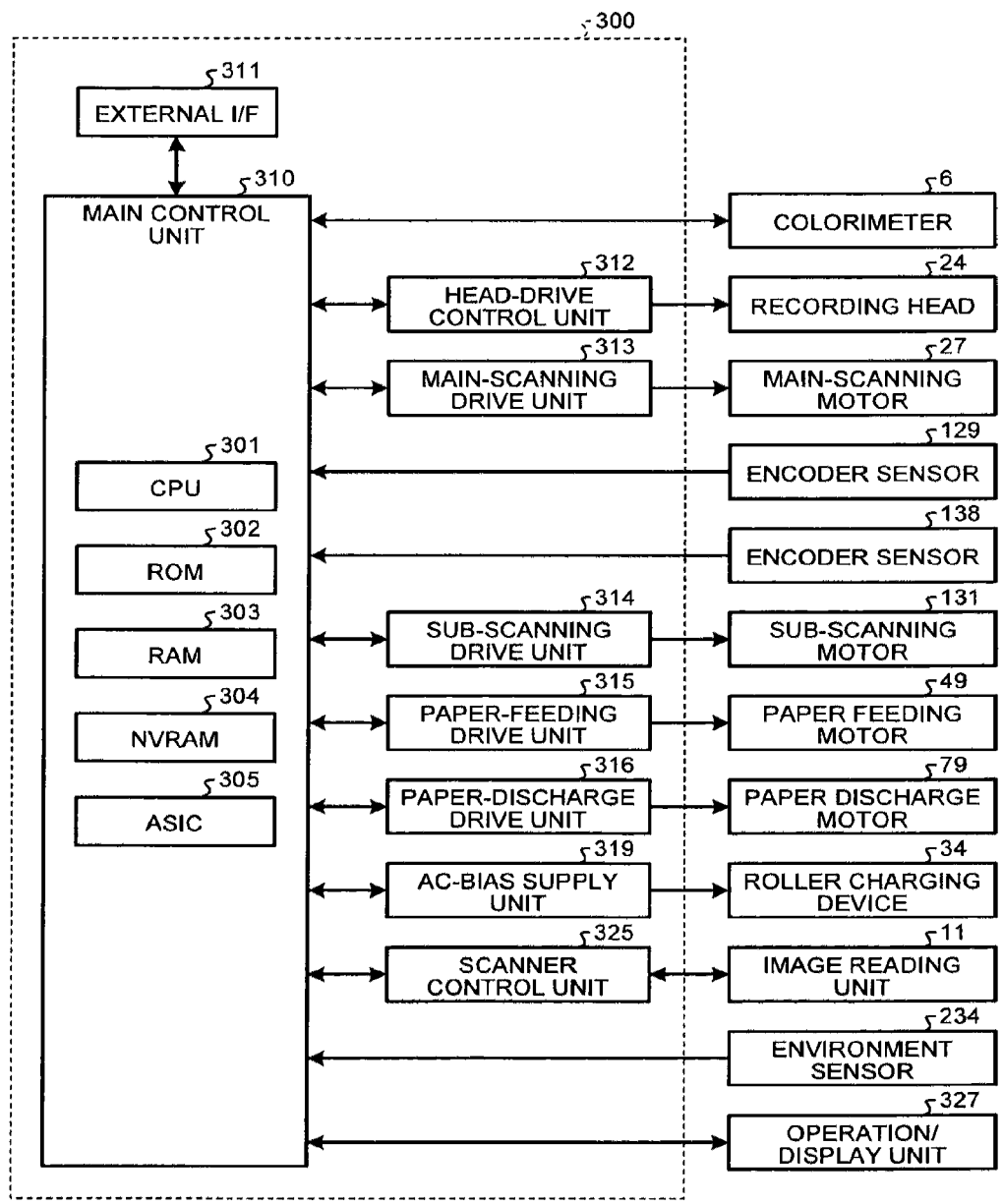
FIG. 4 is a block diagram of a control unit of the image forming apparatus illustrated in FIG. 1.

The control unit 300 of the image forming apparatus will be schematically described below. FIG. 4 is a block diagram of the control unit 300 of the image forming apparatus 1.

The control unit 300 includes a main control unit 310 that controls the overall image forming apparatus. The main control unit 310 includes a central processing unit (CPU) 301, read only memory (ROM) 302 that stores program instructions to be executed by the CPU 301 and other fixed data, random access memory (RAM) 303 that temporarily stores image data and the like, a nonvolatile memory (nonvolatile random-access memory (NVRAM)) 304 that retains data even while power supply to the apparatus is shut off, and an application-specific integrated circuit (ASIC) 305 that performs various types of signal processing on image data and image processing such as sorting, and processes input/output signals for use in controlling the overall apparatus.

The control unit 300 further includes an external interface (I/F) 311 interposed between host equipment or an external storage apparatus and the main control unit 310 for exchanging data and signals therebetween; a head-drive control unit 312 that includes a head driver (in practice, the head driver is provided on the side of the recording heads 24) that controls and drives the recording heads 24 and includes an ASIC for converting generated head data sequences; a main-scanning drive unit (motor driver) 313 that drives the main-scanning motor 27 that moves the carriage 23 for scanning; a sub-scanning drive unit (motor driver) 314 that drives the sub-scanning motor 131; a paper-feeding drive unit 315 that drives the paper feeding motor 49; a paper-discharge drive unit 316 that drives a paper discharge motor 79 that drives the rollers of the output-paper conveying unit 7; an alternating-current (AC)-bias supply unit 319 that supplies an AC bias to the roller charging device 34; and a scanner control unit 325 that controls the image reading unit 11. The control unit 300 further includes, although not shown, a recovery-system drive unit that drives a maintenance-and-recovery motor that drives the maintenance-and-recovery mechanism 121, a duplex-printing drive unit that drives the duplex printing unit when the duplex printing unit is attached, a solenoid (SOL) drive unit (driver) that drives various types of solenoids, and a clutch drive unit that drives electromagnetic clutches and the like.

The main control unit 310 receives various detection signals, such as signals output from an environment sensor 234 that detects temperature and humidity (environmental conditions) of the surroundings of the carriage belt 31. Other detection signals output from various types of other sensors are also input to the main control unit 310; however, illustration of them are omitted. The main control unit 310 receives necessary key entries entered from an operation/display unit 327 including various keys, such as numeric keys and a print start key, provided on the apparatus body and outputs display information to various types of indicators of the operation/display unit 327.

Output signals of a photosensor (encoder sensor) 129 of the linear encoder described above that detects a position of the carriage 23 are also input to the main control unit 310. The main control unit 310 controls and drives the main-scanning motor 27 via the main-scanning drive unit 313 based on the output signals, thereby causing the carriage 23 to reciprocate in the main-scanning direction. Output signals (pulses) of the photosensor (encoder sensor) 138 of the rotary encoder described above that detects a rotation amount of the carriage belt 31 are also input to the main control unit 310. The main control unit 310 controls and drives the sub-scanning motor 131 via the sub-scanning drive unit 314 based on the output signals, thereby moving the carriage belt 31 via the carriage roller 32.

The main control unit 310 causes a colorimeter 6 to perform a predetermined color measurement operation. The main control unit 310 then performs control operations to correct color misregistration based on color measurement data fed from the colorimeter 6. The control operations will be described in detail later.

The image forming apparatus 1 performs image forming operations by performing process control described below. First, the rotation amount of the carriage roller 32 that drives the carriage belt 31 is detected. The sub-scanning motor 131 is controlled and driven according to the detected rotation amount. Simultaneously, the AC-bias supply unit 319 applies a high voltage of bipolar rectangular waves, or an alternating voltage, to the roller charging device 34. As a result, positive and negative charges are applied to a belt-like area on the carriage belt 31 alternately with reference to the conveying direction of the carriage belt 31. Accordingly, a predetermined width of the carriage belt 31 is electrostatically charged, and hence a non-uniform electric field is generated.

The sheet 5 is fed from the paper feeding unit 4 into the nip between the carriage roller 32 and the pressure roller 36, which in turn convey the sheet 5 onto the carriage belt 31, on which the non-uniform electric field is generated by buildup of the positive and negative charges. At an instant when the sheet 5 is fed onto the carriage belt 31, the sheet 5 is polarized along a direction of the electric field and attracted onto the carriage belt 31 by electrostatic attraction, causing the sheet 5 to be conveyed as the carriage belt 31 moves.

The sheet 5 is intermittently conveyed by the carriage belt 31. Ink droplets are ejected from the recording heads 24 onto the sheet 5 that is at rest, while moving the carriage 23 in the main-scanning direction, to record (print) an image onto the sheet 5. The separation claw 38 separates a leading end of the sheet 5 thus printed from the carriage belt 31 to deliver the sheet 5 to the output-paper conveying unit 7. The output-paper conveying unit 7 delivers the sheet 5 onto the paper discharge tray 8.

During print standby, the carriage 23 is moved to the side of the maintenance-and-recovery mechanism 121 with the nozzle surfaces of the recording heads 24 capped with the caps 122 to keep the nozzles wet, thereby preventing defective ejection caused by ink drying. Furthermore, a recovery operation is performed by sucking the recoding liquid through the nozzles of the recording heads 24 that are capped with the suction cap 123 and moisture-retentive caps 122 to discharge thickened ink and air bubbles.

During the recovery operation, ink sticks to the nozzle surfaces of the recording heads 24. The wiper blade 124 wipes the nozzle surfaces to remove the ink. Before start of or during printing, idler ejection is performed by ejecting ink, which is not involved in the printing, toward the idler-ejection receiving members 125 and 126. By performing the idler ejection, stable ejection performance of the recording heads 24 is maintained.

Figure 5:
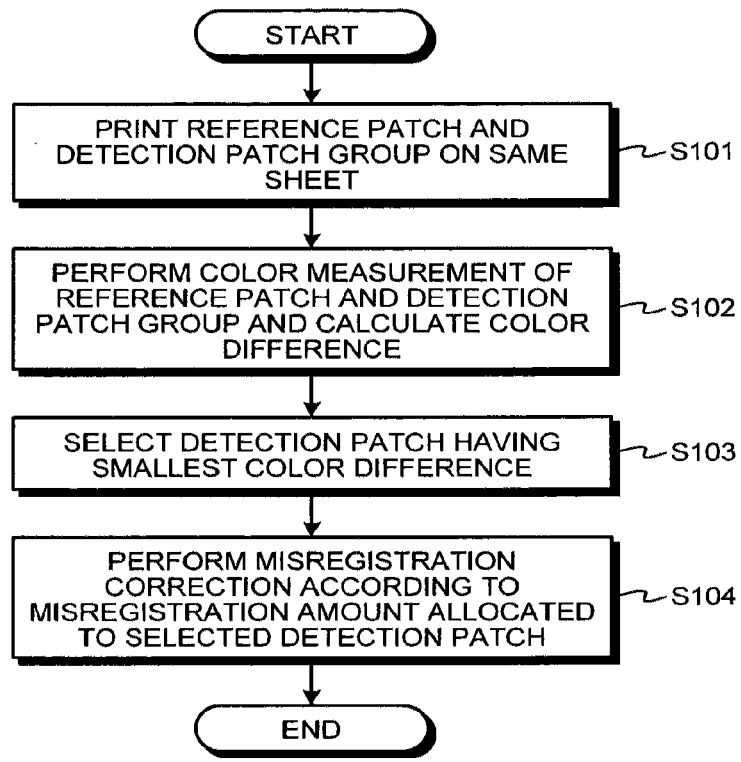
FIG. 5 is a flowchart illustrating of an exemplary color-misregistration correction process to be performed by the image forming apparatus according to the present embodiment.

Next, color-misregistration correction performed by the image forming apparatus 1 will be described below. Color-misregistration correction is described below by way of an example of correcting color misregistration caused by advance or retard of drive timing of the ink ejection head $24m$ for magenta. FIG. 5 is a flowchart illustrating an exemplary color-misregistration correction process to be performed by the image forming apparatus according to the present embodiment. Operations in the flowchart are controlled and executed by the CPU 301 according to program instructions stored in the ROM 302 of the main control unit 310.

First, at Step S101, the image forming unit 2 prints a reference patch and a detection patch group with ink of a plurality of colors on the same sheet 5 that is fed from the paper feeding unit 4 and conveyed by the sub-scanning conveying unit 3.

The reference patch and the detection patch group will be described below. The reference patch is formed by overlaying predetermined dot array patterns of a plurality of colors. The dot array patterns of the plurality of colors to be overlaid have no correlation therebetween.

Figure 6A:
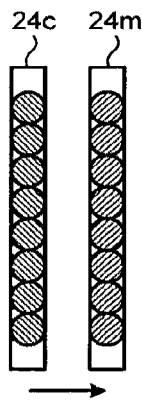
FIG. 6A is a diagram illustrating a cyan ink ejection head and a magenta ink ejection head.
Figure 6B:
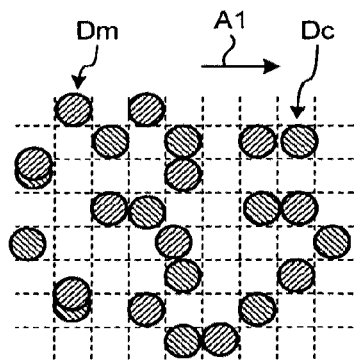
FIG. 6B is a diagram illustrating a reference patch printed with no color misregistration, which is generated by error diffusion with different parameters.
Figure 6C:
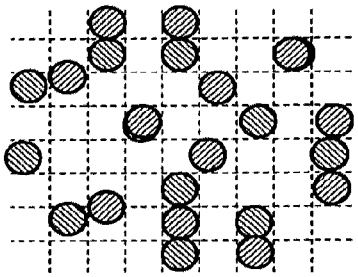
FIG. 6C is a diagram illustrating a reference patch printed with color misregistration, which is generated by error diffusion with different parameters.

With reference to FIGS. 6A to 6C, an explanation will be made in a case where a reference patch is formed with a cyan dot array pattern and a magenta dot array pattern generated by using an error diffusion method with different parameters. In this example, the reference patch is printed by using the cyan ink ejection head $24c$ and the magenta ink ejection head $24m$ as illustrated in FIG. 6A. In the present embodiment, color combination is not limited to cyan and magenta, and any appropriately-selected colors can be used.

FIG. 6B is a view illustrating the reference patch printed with no color misregistration, the view being enlarged for visual recognition of dots. Reference symbols Dc and Dm denote cyan dots and magenta dots, respectively. It is assumed that a dot is to be printed substantially in a square surrounded by broken lines. As described above, in the dot array pattern generated by using an error diffusion method, dots are arranged randomly but at regular intervals in a direction indicated by an arrow A1 in FIG. 6B. Meanwhile, even when a difference in parameter (difference in input values, added noises, data distribution size, weight matrices for error diffusion, or the like) is small, dot array patterns generated by using the error diffusion method differ from each other. Accordingly, the cyan dot array pattern and the magenta dot array pattern have no correlation therebetween, and each of the dots Dc and each of the dots Dm stochastically overlap on each other or are present alone without overlapping on each other.

It is assumed that, as indicated by an arrow in FIG. 6A, drive timing of the ink ejection head $24m$ for magenta is off. More specifically, when impact positions of the magenta dots Dm are shifted by a distance of, for instance, one dot in a direction indicated by the arrow A1 of FIG. 6B, such a printout as illustrated in FIG. 6C is obtained by printing the reference patch. However, as described above, the cyan dot array pattern and the magenta dot array pattern have no correlation therebetween and dots in the patterns are arranged at regular intervals in the direction indicated by the arrow A1. Accordingly, the size of an area where the dots Dc and Dm overlap stochastically remains invariant. Therefore, even when the reference patch is printed with color misregistration, a color tone of the reference patch is substantially invariant irrespective of an amount of the misregistration.

Figure 7:
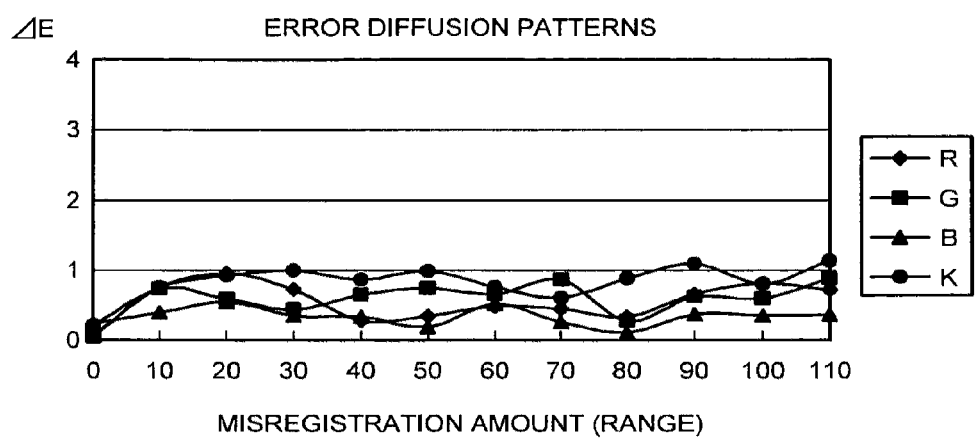
FIG. 7 is a diagram illustrating a relationship between color misregistration amounts and color differences ΔE in a situation where the reference patch is formed with the dot array patterns generated by the error diffusion.

FIG. 7 is a diagram illustrating a relationship between color misregistration amounts and color differences ΔE in a situation where a reference patch is formed with dot array patterns (error diffusion patterns) generated by using the error diffusion method. In FIG. 7, the color difference is shown in numerical values of R, G, B, and K when the value of zero represents a reference registration amount. As illustrated in FIG. 7, when the reference patch is formed with the error diffusion patterns, the color difference ΔE is 1.0 or less irrespective of the misregistration amount. Accordingly, it can be concluded that color tone is substantially invariant.

Next, the detection patch group will be described below. The detection patch group includes a plurality of detection patches. Each of the detection patches is formed by overlaying predetermined dot array patterns of a plurality of colors on one another. The dot array patterns of colors to be overlaid are the same in cycle of regular dot array. Furthermore, the detection patches are allocated with different misregistration amounts. The detection patch group includes a detection patch to which a misregistration amount of zero is allocated. The dot array patterns of the detection patch, of which misregistration amount is zero, and the reference patch are designed so as to have a same color tone when the patches are printed by using a predetermined combination of the sheet 5 and ink to be used. Note that, having a same color tone means that the color difference, which is expressed by using, for instance, L*a*b* values, between the detection patch, of which misregistration amount is zero, and the reference patch is equal to or lower than 1.0.

Here, the regular dot array means fixed regularity of dot array in a dot array pattern generated by dithering using amplitude modulation (AM) screens or the like. For instance, dot array patterns generated by, for instance, AM dithering have fixed regularity (i.e., regular dot array) basically in every tone level. The regularity of the dot array pattern remains invariant even at different tone levels. Different tone levels are expressed by changing the size of a dot (or a group of dots). For instance, to represent a high tone level, the size of the dot is increased. Meanwhile, the cycle of the regular dot array means a cycle of a dot array pattern having regularity. Furthermore, dot array patterns having the same cycle of the regular dot array means that the cycles of the regularities of the dot array patterns are identical to each other. Accordingly, when, for instance, a dot array pattern in which right-up screen lines inclined 45 degrees relative to a horizontal line (a line parallel to the main-scanning direction) are arranged parallel to one another at regular intervals is used as the reference pattern, a dot array pattern in which screen lines parallel to the horizontal line are arranged parallel to one another at regular intervals has a regular dot array different from that of the reference pattern. A dot array pattern in which right-up screen lines inclined 45 degrees relative to the horizontal line are arranged parallel to one another at regular intervals that differ from the intervals of the reference pattern has the same regular dot array as that of the reference pattern but differs from the reference pattern in cycle of the regular dot array.

Figure 8A:
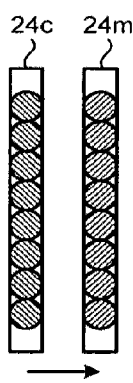
FIG. 8A is a diagram illustrating the cyan ink ejection head and the magenta ink ejection head.
Figure 8B:
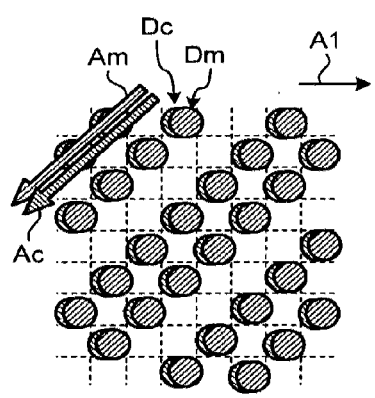
FIG. 8B is a diagram illustrating a detection patch printed with no color misregistration, which is generated by using line screens having a same screen angle.
Figure 8C:
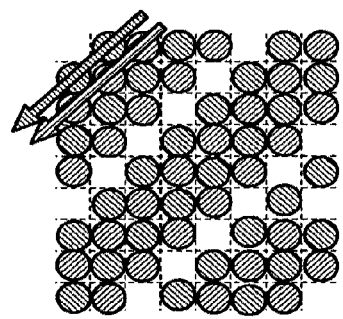
FIG. 8C is a diagram illustrating a detection patch printed with color misregistration, which is generated by using line screens having a same screen angle.

With reference to FIGS. 8A to 8C, an explanation will be made in a case where a detection patch is formed with a cyan dot array pattern and a magenta dot array pattern generated by using line screens, or AM dithering. Note that a line screen is synonymous with a line dither matrix. Also in this example, the detection patch is printed by using the cyan ink ejection head 24c and the magenta ink ejection head 24m as illustrated in FIG. 8A, as with the case of the reference patch.

FIG. 8B is a view illustrating the detection patch printed with no color misregistration, the view being enlarged for visual recognition of dots. Reference symbols Dc and Dm denote cyan dots and magenta dots, respectively. Array Ac and array Am indicate a direction of line screens formed with cyan dots and that formed with magenta dots, respectively. In each of the cyan dot array pattern and the magenta dot array pattern illustrated in FIG. 8B, the inclined screen lines formed with dots have such a periodicity that pairs of screen lines are arranged parallel to each other at a one-dot distance therebetween. Thus, in the detection patch, the cyan dot array pattern and the magenta dot array pattern are formed with line screens that are identical in pattern and screen angle. Accordingly, in the detection patch, the cyan dot array pattern and the magenta dot array pattern have the same regular dot array and the same cycle of the regular dot array. Note that a screen angle is an angle between screen lines and the horizontal line.

It is assumed that, as indicated by an arrow in FIG. 8A, drive timing of the ink ejection head 24m for magenta is off as in the case of FIG. 6A. More specifically, when impact positions of the magenta dots Dm are shifted by a distance of, for instance, one dot in a direction indicated by an arrow A1 of FIG. 8B, such a printout as illustrated in FIG. 8C is obtained by printing the detection patch. In this case, in the detection patch, the cyan dot array pattern and the magenta dot array pattern are formed with the same line screens. Accordingly, the size of an area where the dots Dc and Dm overlap varies depending on an amount of misalignment of the impact positions (i.e., color misregistration). Therefore, when the detection patch is printed as being color misregistered the color tone of the detection patch changes depending on the misregistration amount. The color tone changes in the cycles of regular dot array of the line screens.

Figure 9:
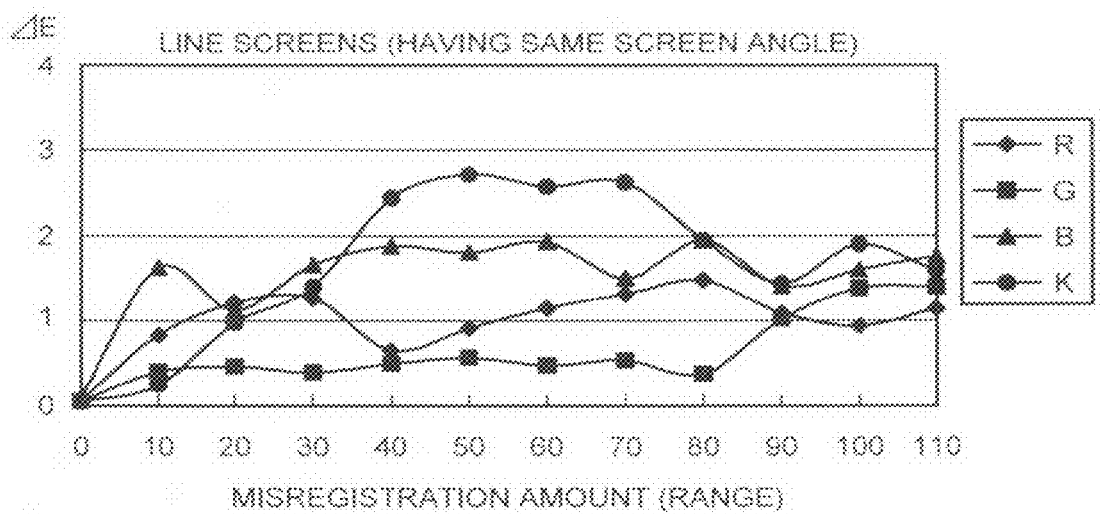
FIG. 9 is a diagram illustrating a relationship between color misregistration amounts and the color difference ΔE in a situation where the detection patch is formed with the dot array patterns generated by using the line screens having the same screen angle.

FIG. 9 is a diagram illustrating a relationship between color misregistration amounts and color differences ΔE in a situation where a detection patch is formed with dot array patterns generated by using line screens having the same screen angle. In FIG. 9, the color difference is shown in numerical values of R, G, B, and K when the value of zero represents a reference registration amount. In this case, the color difference gradually changes within the cycle of regular dot array of the line screens, and when the misregistration amount reaches one cycle of regular dot array, the color difference becomes zero.

As described above, in the detection patch group, the misregistration amounts in the dot array patterns are different from each other. Accordingly, in the detection patch group, each of the detection patches has a different color tone that depends on the misregistration amount allocated to the detection patch. The color tone of the detection patch group periodically changes in the cycle of regular dot array.

Note that in printing the detection patch group, each of the dot array patterns is individually printed. Every time a detection patch is printed on the sheet 5, timing for driving the recording heads 24 is shifted according to the misregistration amount allocated to the detection patch. Alternatively, all the dot array patterns of the detection patches may be recorded at one time. In this case, for each of the detection patterns, the dot array patterns misregistered by an amount allocated to the detection patch are formed, and the thus-formed detection patches are printed on the sheet 5.

Meanwhile, recording quality of the reference patch and the detection patch group printed on the sheet 5 as described above varies depending on a print condition (a combination of ink to be used and the sheet 5, ink ejection condition, and the like). Accordingly, there can be a case where each of the printed patches are printed in colors different from desired print colors preset in a development environment or the like, and hence color tones of the patches are undesirably changed.

Thus, the reference patch is printed not only as being color misregistered but also such that, although a color tone of the printed reference patch does not vary depending on a color misregistration amount, the color tone is changed under an influence of the print condition. In contrast, the detection patch group is printed as being color misregistered by the same color misregistration amount as that of the reference patch. Furthermore, a color tone of each detection patch of the printed detection patch group varies depending on this color misregistration amount and the misregistration amount allocated to the detection patch. Still furthermore, the color tone of the detection patch is changed under the influence of the print condition.

Figure 10:
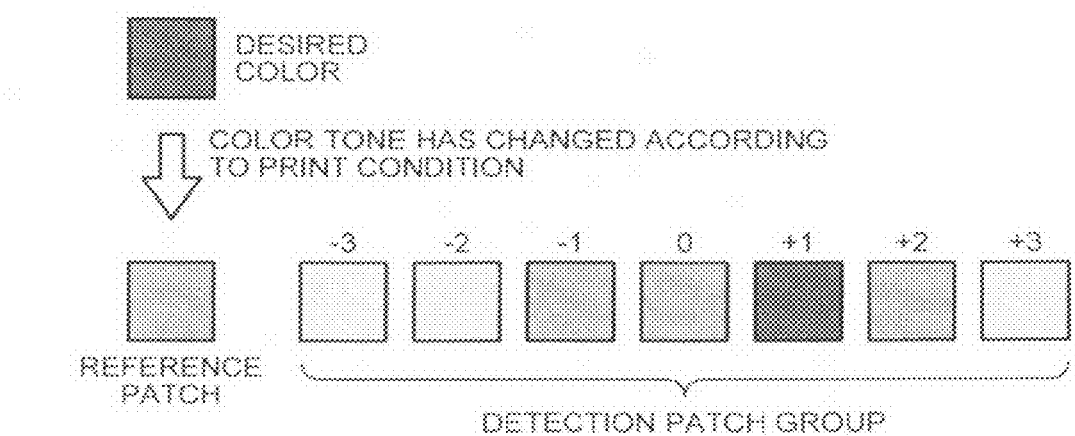
FIG. 10 is a diagram illustrating a printed reference patch and a printed detection patch group.

FIG. 10 is a diagram illustrating an example of a desired color, and a printed reference patch and a printed detection patch group. Numerical values on the detection patch group indicate misregistration amounts each allocated to a corresponding detection patch. As illustrated in FIG. 10, the reference patch has a color tone that differs from the desired color under an influence of a print condition. The detection patches of the detection patch group are under the influence of the print condition, and the color tones of the detection patches differ from one another depending on the misregistration amount allocated to each detection patch.

Referring back to FIG. 5, at Step S102, the colorimeter 6 performs color measurement of the reference patch and the detection patch group printed on the sheet 5, and transmits color measurement data to the main control unit 310. In the main control unit 310, the CPU 301 calculates color differences between the reference patch and each detection patch of the detection patch group from the color measurement data transmitted from the colorimeter 6.

Meanwhile, the reference patch and the detection patch group are printed in the same print condition. Accordingly, even when the color tone is changed under the influence of the print condition, the degree of the change of the reference patch and that of the detection patch group are equal to each other. Accordingly, comparison between the color tone of the reference patch and the color tone of each of the detection patches of the detection patch group can be performed without involving an error resulting from a change in color tone caused under the influence of the print condition. By, in particular, calculating color differences as described above, a change in color tone caused under the influence of the print condition can be cancelled. Further, the calculated color difference varies in the cycle of regular dot array depending on the misregistration amount allocated to each of the detection patches. The cycle of regular dot array is also unaffected by the print condition. Accordingly, a color misregistration amount free from an error caused under the influence of the print condition can be obtained by performing back calculation based on the color differences.

Subsequently, at Step S103, the CPU 301 selects a detection patch having a smallest color difference from the detection patch group. In the example illustrated in FIG. 10, a detection patch, to which misregistration amount "−1" is allocated, is selected.

Subsequently, at Step S104, the CPU 301 performs color misregistration correction according to the misregistration amount allocated to the detection patch selected at Step S103. In the example illustrated in FIG. 10, the misregistration amount "−1" is allocated to the selected detection patch. Accordingly, the CPU 301 performs color misregistration correction only by "+1". This correction is performed by the CPU 301 by, for instance, causing the head-drive control unit 312 to control the recording heads 24 to thereby change head-drive timing or by performing offset adjustment on image data that is temporarily stored in the RAM 303. Alternatively, a position adjustment mechanism that adjusts the position of the recording heads 24 may be provided so that the correction is performed by the position adjustment mechanism.

As described above, the image forming apparatus 1 according to the present embodiment can correct color misregistration more accurately. Accordingly, even when a print condition deviates from that assumed by a designer such that, for instance, a user uses paper other than designated paper as the sheet 5, more accurate color misregistration correction can be performed.

Figure 13:
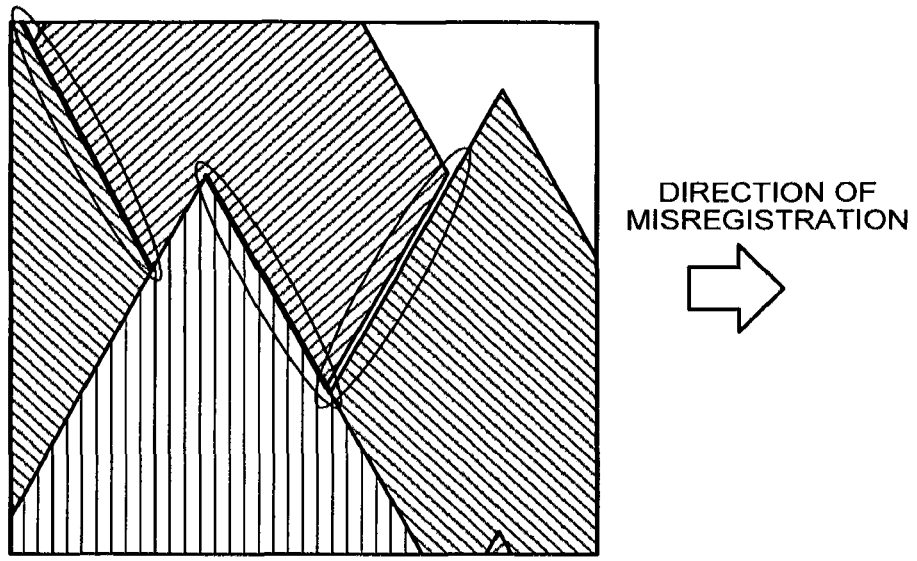
FIG. 13 is a diagram illustrating an exemplary image, in which misregistration of single-color images has occurred.
Figure 14:
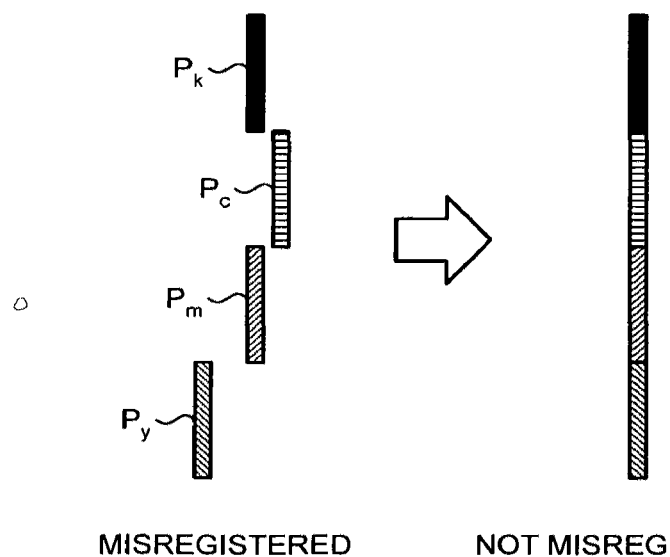
FIG. 14 is a diagram explaining a conventional color-misregistration correcting method.
Figure 15:
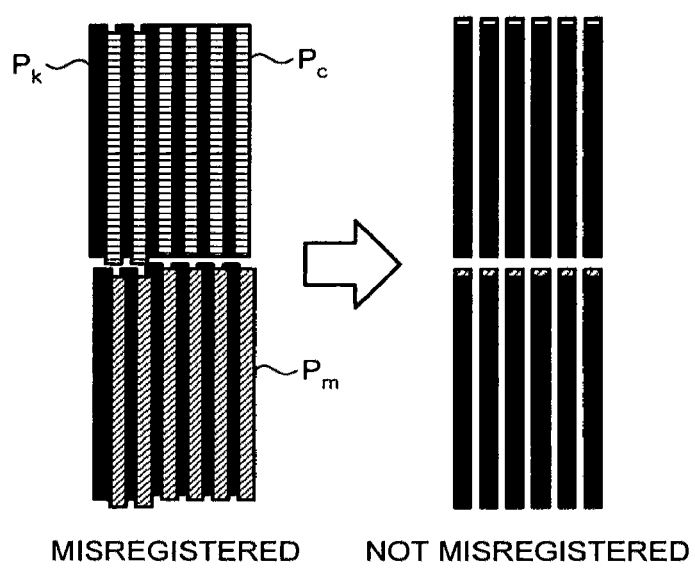
FIG. 15 is another diagram explaining the conventional color-misregistration correcting method.

As for images of a character, a line, a graphic, or the like, for which importance is placed on sharpness, even when color misregistration amount is small, such a pattern as that illustrated in FIG. 13 in which color misregistration continually occurs is very obtrusive. In a case of a small-size letter of a mixed color, color misregistration can make the letter unrecognizable. Accordingly, when recording these images, it is particularly preferable to correct color misregistration accurately according to the present invention.

In the embodiment described above, the detection patch group is formed with dot array patterns generated by using line screens having a same screen angle. However, any dot array patterns can be employed so long as principle cycles of the dot array patterns of colors to be overlaid are same. In the example illustrated in FIG. 8B, the cyan dot array pattern and the magenta dot array pattern are completely identical in the number of dots and coordinates of the dots. However, even when dot array patterns that differ from each other in the number of dots and coordinates of the dots can have the same cycle of regular dot array. More specifically, even when, for instance, dot array patterns differ from each other in the phase of a cycle of regular dot array, in the number of dots constituting a single screen line, or in the density of dots, the dot array patterns have the same cycle of regular dot array so long as cycles of regularities of the dot array patterns are identical to each other.

In the embodiment described above, the reference patch is formed with dot array patterns generated by using an error diffusion method. However, any dot array patterns can be employed so long as the dot array patterns of colors to be overlaid have no correlation therebetween.

With reference to FIGS. 11A to 11C, another example of the reference patch, an explanation of another example will be made in a case where a reference patch is formed with a cyan dot array pattern and a magenta dot array pattern generated by using line screens of which screen angles differ from each other by 90 degrees. Also in this example, the reference patch is printed by using the cyan ink ejection head 24c and the magenta ink ejection head 24m as illustrated in FIG. 11A.

FIG. 11B is a view illustrating the reference patch printed with no color misregistration, the view being enlarged for visual recognition of dots. Reference symbols Dc and Dm denote cyan dots and magenta dots, respectively. Array Ac and array Am indicate a direction of line screens formed with cyan dots and that formed with magenta dots, respectively. In each of the cyan dot array pattern and the magenta dot array pattern illustrated in FIG. 11B, the inclined screen lines formed with dots have such a periodicity that pairs of screen lines are arranged parallel to each other at a one-dot distance therebetween. However, note that screen angles of the screen lines of the cyan dot array pattern and the magenta dot array pattern differ from each other by 90 degrees. In the dot array patterns generated by the line screens whose screen angles differ from each other by 90 degrees in this way, overlapping of dots Dc and Dm occur at intersections of the screen lines in practice. Accordingly, even when, as indicated by an arrow in FIG. 11A, drive timing of the ink ejection head 24m for magenta is off and accordingly an impact positions of the magenta dots Dm are displaced by an amount of, for instance, one dot in a direction indicated by arrow A1 of FIG. 11B, causing such a printout as illustrated in FIG. 11C to be obtained, only coordinates of the intersections of the screen lines are changed but the size of an area where the dots Dc and Dm overlap remains invariant. Therefore, even when the reference patch in this example is printed as being color misregistered, a color tone of the reference patch is substantially invariant irrespective of the misregistration amount.

FIG. 12 is a diagram illustrating a relationship between color misregistration amounts and color differences ΔE in a situation where a reference patch is formed with dot array patterns generated by using line screens of which screen angles differ from each other by 90 degrees. Meanwhile, in FIG. 12, the color difference is shown in numerical values of R, G, B, and K when the value of zero represents a reference misregistration amount. Also with regard to the reference patch illustrated in FIG. 12, the color difference ΔE is approximately 1.0 irrespective of the misregistration amount. Accordingly, it can be concluded that color tone remains substantially invariant.

Examples of dot array patterns of which characteristics are close to those of a pattern generated by error diffusion include frequency modulation (FM) dither patterns, such as what is called a blue noise mask pattern and an FM screen pattern. These patterns are also basically designed to have random and uniform dot arrangement. Accordingly, unless otherwise masks having the completely same pattern and the same cycle are used for different colors, it is possible to yield a similar effect by using one of these patterns as that yielded by a pattern obtained by using an error diffusion method. Such patterns are appropriate for use in generating the reference patch. It is also possible to form the reference patch with patterns generated by using the same FM mask for different colors so long as the patterns are extracted at different positions to have different initial patterns.

Program instructions to be executed by the image forming apparatus 1 according to the present embodiment are provided as being stored in the ROM 301 in advance. The program instructions may be provided as being recorded in a computer-readable recording medium such as a compact disc-read-only memory (CD-ROM), a flexible disk (FD), a compact disc recordable (CD-R), or a digital versatile disk (DVD) in an installable or executable format.

The program instructions to be executed by the image forming apparatus 1 according to the present embodiment may be stored in a computer connected to a network such as the Internet so that the program instructions are provided by downloading over the network. Further alternatively, the program instructions may be provided or distributed over a network, such as the Internet.

The patterns of the reference patch and the detection patch group for use by the image forming apparatus 1 according to the present embodiment may be incorporated as an inspection function of the image forming apparatus 1 by being stored in the ROM 302 in advance or being configured to be written to the RAM 303. The patterns of the reference patch and the detection patch group may be provided, as image chart data for inspection, as being recorded in the computer-readable recording medium, such as a CD-ROM, in an installable or executable format or provided by downloading over the network.

The colorimeter 6 may be provided in the image forming apparatus 1 or may be externally provided and connected via the external I/F 311. Color measurement of the reference patch and the detection patch group may be alternatively performed by the image reading unit 11. Color misregistration may be corrected by visually comparing the reference patch and each of the detection patches of the detection patch group and selecting a detection patch having a color tone close to that of the reference patch, and inputting a misregistration amount assigned to the selected detection patch to the main control unit 310 from the operation/display unit 327.

The image forming apparatus according to the embodiment has a copying function, a printer function, a scanner function, and a facsimile function; however, the present invention is applicable to any image forming apparatus, such as a copier, a printer, a scanner, or a facsimile machine.

According to an aspect of the present invention, color misregistration correction is performed based on a result of comparison of color tones between a reference patch and a detection patch group formed on the same recording medium.

Accordingly, error in determination of a misregistration amount that may otherwise be caused when the misregistration amount depends on a recording quality on the recording medium can be reduced. As a result, an effect that color misregistration can be corrected more accurately is yielded.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus that includes recording heads, the recording heads ejecting recording liquids of a plurality of colors onto a recording medium, and performs multiple-color recording, the image forming apparatus comprising:
   a reference-patch forming unit configured to record a reference patch on the recording medium, the reference patch being formed by overlaying dot array patterns recorded with the recording liquids of different colors, the dot array patterns having no correlation therebetween;
   a detection-patch-group forming unit configured to record a detection patch group including detection patches on the recording medium, each of the detection patches being formed by overlaying dot array patterns recorded with the recording liquids of the different colors, the dot array patterns having a same cycle of regular dot array, the detection patches being allocated with different misregistration amounts of the dot array patterns; and
   a color-misregistration correcting unit configured to correct color misregistration based on results of comparison between color tone of the reference patch and color tone of each of the detection patches of the detection patch group,
   wherein the reference-patch forming unit and the detection-patch-group forming unit form the reference patch and the detection patch group, respectively, such that a color difference between the reference patch and a detection patch of the detection patches of the detection patch group, to which zero is allocated as the misregistration amount, is equal to or lower than 1.0 when the reference patch and the detection patch are recorded by using a combination of the recording medium and the recording liquids.

2. The image forming apparatus according to claim 1, further comprising a color-difference calculating unit that calculates color differences between the reference patch and the each of the detection patches of the detection patch group, wherein the color-misregistration correcting unit corrects the color misregistration based on results of comparison between the color tones using the color differences.

3. The image forming apparatus according to claim 2, wherein the color-misregistration correcting unit corrects the color misregistration according to a misregistration amount allocated to a detection patch having, relative to the reference patch, a smallest color difference of the color differences.

4. The image forming apparatus according to claim 1, wherein the reference-patch forming unit forms the dot array patterns by using an error diffusion method.

5. The image forming apparatus according to claim 1, wherein the reference-patch forming unit forms the dot array patterns by any one of dithering that uses AM screens having screen angles that differ from each other on a color-by-color basis of the colors to be overlaid and dithering that uses FM screens having any ones of patterns and cycles, the ones of the patterns and the cycles differing from each other on the color-by-color basis of the colors to be overlaid.

6. The image forming apparatus according to claim 1, wherein the detection-patch-group forming unit forms the dot array patterns by dithering that uses AM screens having a same screen angle for the colors to be overlaid.

7. The image forming apparatus according to claim 1, wherein the detection-patch-group forming unit records the detection patch group on the recording medium by individually recording each of the dot array patterns and by shifting, for each detection patch of the detection patches, drive timing of the recording head by an amount that depends on the misregistration amount allocated to the detection patch.

8. The image forming apparatus according to claim 1, wherein the detection-patch-group forming unit forms, for each of the detection patches, the dot array patterns misregistered by an amount corresponding to the misregistration amount allocated to the detection patch and records the formed dot array patterns of each of the detection patches on the recording medium.

9. A color-misregistration correcting method of correcting color misregistration occurred in an image forming apparatus that includes recording heads that eject recording liquids of a plurality of colors onto a recording medium, the color-misregistration correcting method comprising:
forming a reference patch on the recording medium by overlaying dot array patterns recorded with the recording liquids of different colors, the dot array patterns having no correlation therebetween;
forming a detection patch group including detection patches on the recording medium, each of the detection patches being formed by overlaying dot array patterns recorded with the recording liquids of the different colors, the dot array patterns having a same cycle of regular dot array, the detection patches being allocated with different misregistration amounts of the dot array patterns; and
correcting color misregistration based on results of comparison between color tone of the reference patch and color tone of each of the detection patches of the detection patch group,
wherein the reference patch forming and the detection patch group forming form the reference patch and the detection patch group, respectively, such that a color difference between the reference patch and a detection patch of the detection patches of the detection patch group, to which zero is allocated as the misregistration amount, is equal to or lower than 1.0 when the reference patch and detection patch are recorded by using a combination of the recording medium and the recording liquids.

10. A computer program product comprising a non-transitory computer-readable medium including computer-readable program codes embodied in the medium for correcting a color misregistration occurred in an image forming apparatus that includes recording heads that eject recording liquids of a plurality of colors onto a recording medium, the program codes when executed causing a computer to perform:
causing the image forming apparatus to form a reference patch on the recording medium by overlaying dot array patterns recorded with the recording liquids of different colors, the dot array patterns having no correlation therebetween;
causing the image forming apparatus to form a detection patch group including detection patches on the recording medium, each of the detection patches being formed by overlaying dot array patterns recorded with the recording liquids of the different colors, the dot array patterns having a same cycle of regular dot array, the detection patches being allocated with different misregistration amounts of the dot array patterns; and
causing the image forming apparatus to correct color misregistration based on results of comparison between color tone of the reference patch and color tone of each of the detection patches of the detection patch group,
wherein the reference-patch forming and the detection-patch-group forming form the reference patch and the detection patch group, respectively, such that a color difference between the reference patch and a detection patch of the detection patches of the detection patch group, to which zero is allocated as the misregistration amount, is equal to or lower than 1.0 when the reference patch and the detection patch are recorded by using a combination of the recording medium and the recording liquids.

* * * * *